Patented Feb. 6, 1940

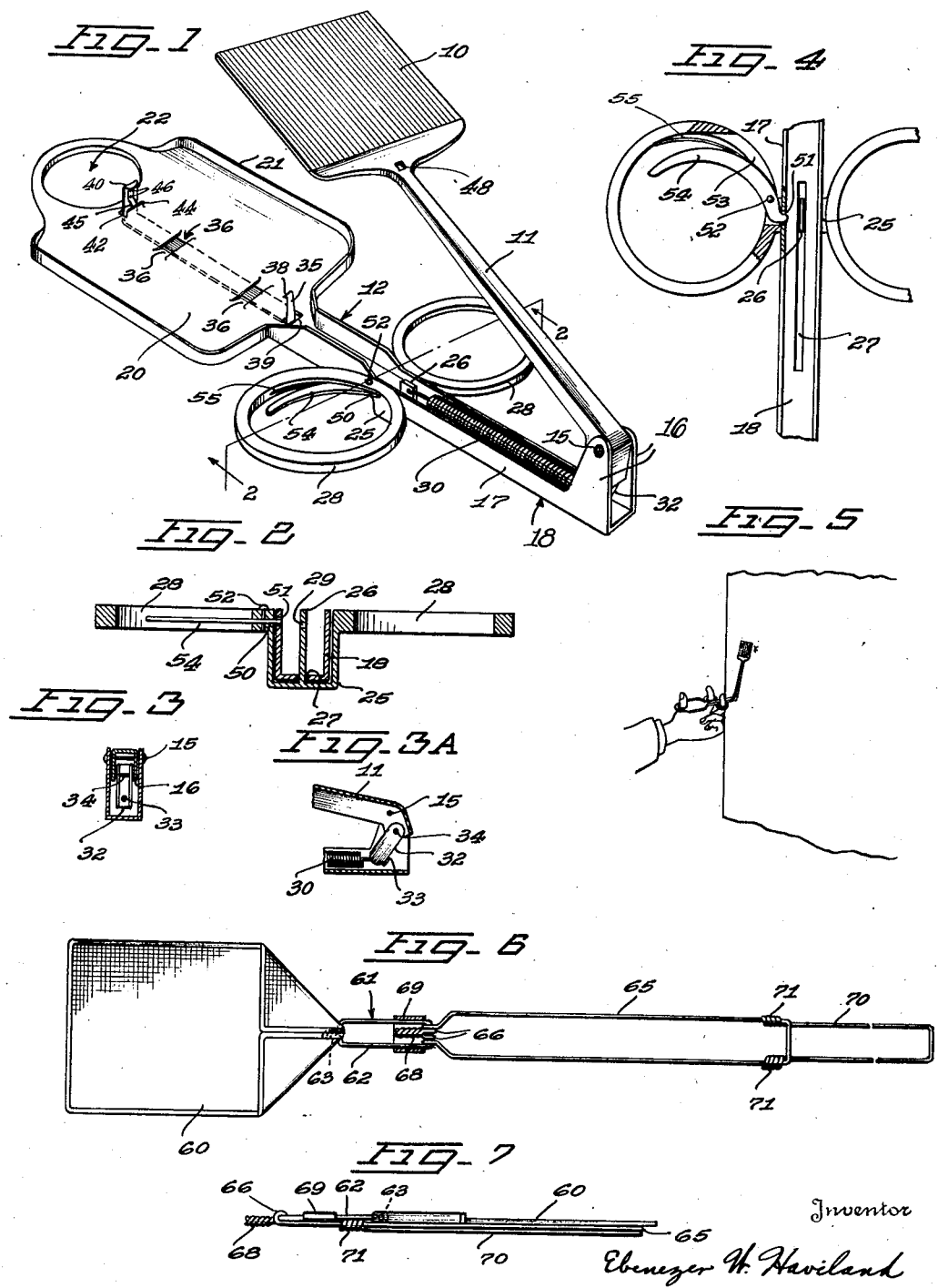

2,189,360

UNITED STATES PATENT OFFICE 2,189,360

FLY SWATTER

Ebenezer W. Haviland, Brookeville, Md.

Application May 2, 1938, Serial No. 205,629

5 Claims. (Cl. 43—135)

This invention relates to fly swatters and has for its general object the provision of folding or collapsible swatters of various types, the size or overall length of which may be reduced as for convenience in transportation, storage, or carrying upon the person.

It is also an object of the invention to provide a fly swatter of this type which also embodies mechanical means for projecting or actuating the swatter blade or "hand" for striking the insect, thus greatly increasing the rapidity or suddenness with which the swatter strikes, as compared with the ordinary hand swung device. Provision is made for retracting the blade or hand and placing it under resilient tension, whereupon it may be suddenly released and projected toward its object with a snap action, which will insure the destruction of the fly before it can possibly take flight.

The invention thus provides a fly swatter which is not only a very effective insect destroyer, but which affords a source of amusement and entertainment as an interesting novelty for children and adults alike.

In all of its various possible forms, the invention contemplates the provision of a blade or hand of any suitable or conventional shape and of any appropriate construction, such as of fabric, leather, rubber, wire brush, wire mesh, or the like. Instead of the usual rigid elongated handle, however, the device is provided with only a relatively short shank connected with or forming a part of the hand or blade, and an extension to which it is pivotally connected, the length of such extension being preferably approximately equal to the length of the blade and shank portion. The device may thus be folded together at the pivotal joint, and the total overall extended length shortened by one-half so that the swatter may be carried in the pocket or disposed in a small space when not in use.

The spring actuated embodiment of the invention, in its preferred form, contemplates the provision of means for suddenly and vigorously swinging the blade and shank away from the handle extension about the pivot point, so as to impart a snap action to the swatter which would be impossible to execute merely by hand. In this form the handle extension member is provided with a seat or receptacle against which the blade carrying member is folded and to which the latter is connected by means of a quickly releasable trigger-actuated catch. The handle member also comprises a retractable spring means for placing the swatting portion of the device under tension, and manually actuated means for retracting the spring means and for retaining it in retracted or "cocked" position. When thus set, release of the trigger actuated catch will permit the swatting blade to snap toward the insect to be exterminated.

Other objects and features of novelty will be apparent from the following specification when read in connection with the accompanying drawing in which certain embodiments of my invention are illustrated by way of example.

In the drawing:

Figure 1 is a view in perspective of one form of fly swatter embodying the principles of my invention;

Figure 2 is a transverse sectional view taken on line 2—2 of Figure 1 and on a slightly enlarged scale;

Figure 3 is a transverse sectional view taken on line 3—3 of Figure 1;

Figure 3A is a fragmentary sectional view taken longitudinally and centrally of the joint between the two pivoted members;

Figure 4 is a fragmentary plan view of a portion of the manipulating means for the swatter;

Figure 5 is a perspective view illustrating the manner of operating the device;

Figure 6 is a plan view of a modified form of folding swatter; and

Figure 7 is a view in side elevation of the same in folded condition.

In the embodiment illustrated in Figures 1 to 5 of the drawing, the swatter blade or hand of the implement is indicated by the numeral 10 and is shown as being of the wire brush or whisk type, although any kind of blade may be employed. The wires forming the blade are secured in any suitable way to the shank 11 which is pivoted or fulcrumed to the main handle member 12 as by means of the pin 15 which passes through the side walls of the shank 11 adjacent the end thereof and also through the ears 16 formed on the handle member 12 by extending portions of the side walls 17 of the substantially U-shaped stem portion 18 of this member. The shank 11 is also preferably of U-shaped cross section, but facing in the opposite direction.

The outer portion of the handle member is widened as at 20 to provide a shield or receptacle for the blade 10 when it is folded back against the handle member. The portion 20 may be provided with a low wall or raised edge 21 for enclosing and protecting the wire blade. A finger opening 22 is formed at the extreme end of the member for a purpose to be later described.

Thus far there has been described a foldable swatter which may be collapsed for carrying in the pocket or other purposes, the blade 10 nesting in the receptacle 20, 21 as already pointed out.

This embodiment is also provided with means for retracting the blade member from its open position and placing it under spring tension for projecting it toward an insect, and this mechanism will now be described.

Slidably disposed, with relation to the narrower stem portion 18 of the handle member 12, is the member 25 which is also preferably U-shaped so as to embrace the stem 18 as clearly shown in Figure 2. A projection 26 is provided on the sliding member 25, which extends upwardly through the slot 27 in the bottom wall of the stem 18. Extending outwardly from each side of the slide 25 are the horizontally disposed rings 28 for the manipulation of the slide in a manner to be described.

The projection 26 on the slide is provided with an opening 29 by means of which one end of a tightly compressed coil spring 30 may be secured to the projection. The spring 30 is disposed within the trough formed by the U-shaped stem 18 and its opposite end is secured to one end of a link 32 as at 33; the other end of the link being pivotally connected as at 34 to the projecting inner end of the blade shank 11. Thus far it will be understood that when the slide 25 is moved toward the head of the handle 12 the blade 10 and shank 11 will be moved outwardly away from the handle member through the linkage comprising the spring 30 and link 32, and when the slide is moved toward the fulcrum or pivot end of the handle, the blade 10 and shank 11 will be swung back toward a substantially parallel position with respect to the handle 12.

In order to retain the blade and shank member 10, 11 in its folded position a latch or catch element 35 is provided on the receptacle or pocket portion 20 of the handle member. The element 35 extends along the under side of the handle portion 20 and may be guided for limited sliding movement by the tongues 36 which are struck from the metal of which the portion 20 is composed. A barbed or hooked end 38 is formed on one end of the element 35 which projects upwardly through the somewhat longitudinally elongated opening 39 at the base of the portion 20 near where it joins the stem portion 18 of the handle member.

The opposite end 40 of the catch 35 projects upwardly through the opening 42 in the portion 20, which is also somewhat enlarged longitudinally of the device. A part of the metal of the plate 20 is struck upwardly as at 44 adjacent the inner margin of the opening 42 and a small leaf spring 45 is secured as at 46 to the end 40 of the catch and is adapted to bear against the portion 44 to urge the slide 35 toward the outer end of the handle member 12.

The blade and shank members 10, 11 are provided with an opening 48 into which the hooked end 38 of the catch 35 is adapted to snap when the two members comprising the swatter are folded together; and it will be readily understood that a slight pressure on the manipulative end 40 of the latch 35 will serve to release the blade member.

The operation of the device will now be described together with such necessary additional elements which have not already been introduced. In the preferred mode of operation of this embodiment of the invention, the forefinger and middle finger are placed in the rings 28 so as to project upwardly therethrough and the thumb is similarly inserted in the end ring 22, as shown in the sketch comprising Figure 5 of the drawing.

By extending the fingers with relation to the thumb the slide 25 is moved toward the jointed end of the handle member 12 and due to the incompressibility of the spring 30, the link 32 is caused to exert pressure on the end of the shank 11 and the latter is swung to folded position against the handle member 12, where it is caught and held by the latch 35.

Then in order to prepare the device for operation, the slide 25 is drawn rearwardly by the fingers in the rings 28, the spring 30 being stretched until the slide nears the rear end of the slot 27. At this point the slide is held by means of the engagement of the detent 50 within the opening 51 in one of the walls 17 of the handle stem 18. The detent 50 is pivoted as at 52 within a slot 53 formed in one of the rings 28 and is provided with a finger contacting portion 54. A small spring member 55 is secured to the detent 50 and serves by pressure against the ring 28 to urge the detent toward the engaging position shown in Figure 3. Release of the detent may be readily accomplished by the resumption of pressure against the part 54 by the forefinger.

When the detent 50 engages the opening 51, the device is cocked and ready for actuation in swatting the fly. The device is held in proper position as indicated in Figure 5 and pressure is applied to the latch release projection 40 by means of the thumb which extends through the opening 22; the blade is released; and through the influence of the spring 30 it is caused to snap suddenly outwardly with sufficient rapidity and force to destroy the insect before it can fly away.

By retracting the slide 25 and tensioning the spring 30 while the swatter is open and unlatched, it may be employed in the conventional manner of a hand swung swatter, the two members 10—11 and 12 being in substantial alignment; the shank 11 and handle member 12 then comprising an elongated handle of common type.

In Figures 6 and 7 of the drawing there is shown another embodiment of folding fly swatter which comprises a hand or blade 60 of suitable construction, having secured thereto a wire shank 61 in the form of an elongated loop 62 extending from the twist 63 to the transversely extending rear portion to which is pivoted the handle member 65. The handle member is also of wire formed into an elongated loop, the two forward ends of the wire being each bent or wrapped a full turn about the transverse end of the shank loop 62, as at 66. Then the projecting ends are preferably twisted together as at 68 to lie in the same plane as the shank loop 62.

In order to retain the swatter in extended operative position with the blade 60, shank 61, and handle 65 in alignment a flat sleeve 69 is slidably mounted on the shank loop 62 so that it may embrace the projecting end 68 of the handle 65 and lock the pivot joint between the two members. In order to release the lock the sleeve 69 is moved to the left as seen in Figure 6, thus freeing the end 68; and the implement may be folded together as shown in Figure 7 with the two members parallel. The length of the swatter is thus reduced by approximately one-half so that it may be carried in the pocket or stored, packed or shipped conveniently. An extension of the handle member may be provided as indicated at 70. This comprises a wire loop the ends 71 of which are wound around the side members of the handle 65 so as to be slidable thereon.

It is understood that various changes and modifications may be made in the proportions, materials, and mode of construction of the embodiments illustrated and described herein without departing from the scope of the invention as defined in the following claims.

Having thus described the invention, what is claimed as new and desired to be secured by Letters Patent is:

1. A foldable fly swatter comprising a handle member and a pivoted striker member, said members being foldable together one against the other, and said handle member being formed with a pocket or receptacle for receiving and guarding said striker member when folded.

2. A fly swatter as set forth in claim 1 in which there are provided on said handle, finger grip elements for manipulating the swatter.

3. A fly swatter of the class described comprising, in combination, a handle member, a striker member fulcrumed thereon, so as to swing from a position in substantial longitudinal alignment with said handle member to a position wherein said members are folded together one against the other, and vice versa, a catch for releasably retaining said members in folded position, a spring operative between said members to swing said striker member away from said folded position toward said position of alignment, finger holds carried by said handle member and manually operable means operatively associated with certain of said finger holds for placing the spring under tension, for retaining said spring in and releasing it from tensioned position, and for releasing the striker holding catch.

4. A fly swatter of the class described comprising, in combination, an elongated handle member, a striker member fulcrumed thereon so as to swing from a position of substantial alignment therewith to a position wherein it is folded against said handle member, and vice versa, a spring catch for retaining said members in folded position, an expansible spring disposed along a portion of said handle member and having one end connected to a point on said striker member beyond said fulcrum point, a member slidable along said handle member and connected with the other end of said spring, finger holds on said sliding member and on said handle member for use in moving said sliding member relatively to said handle member to tension the spring, a detent operating between said sliding member and said handle member for holding said spring in tensioned position, finger actuated means associated with certain of said finger holds for releasing said detent and a trigger operable from a finger hold on the handle member for tripping said spring catch for releasing the striker member.

5. A fly swatter of the class described comprising, in combination, an elongated handle member of U-shaped cross section, a striker member having a short shank fulcrumed on said handle member so as to swing from a position of substantial alignment therewith to a position wherein it is folded against said handle member, and vice versa, a spring catch for retaining said members in folded position, an expansible spring disposed within a portion of said handle member and having one end connected by means of a link to a point on the shank of said striker member beyond said fulcrum point, a member slidable along said handle member and connected with the other end of said spring, finger holds on said sliding member and on said handle member for use in moving said sliding member relatively to said handle member to tension the spring, a detent operating between said sliding member and said handle member for holding said spring in tensioned position, finger actuated means associated with certain of said finger holds for releasing said detent and a trigger operable from a finger hold on the handle member for tripping said spring catch for releasing the striker member.

EBENEZER W. HAVILAND.